(12) United States Patent
Gerardiere

(10) Patent No.: US 9,114,669 B2
(45) Date of Patent: Aug. 25, 2015

(54) METHOD FOR LOCATING THE WHEELS OF A VEHICLE FITTED WITH A SYSTEM FOR MONITORING TIRE PRESSURE

(75) Inventor: Olivier Gerardiere, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 106 days.

(21) Appl. No.: 13/885,858

(22) PCT Filed: Aug. 18, 2011

(86) PCT No.: PCT/EP2011/004167
§ 371 (c)(1),
(2), (4) Date: Jun. 5, 2013

(87) PCT Pub. No.: WO2012/065659
PCT Pub. Date: May 24, 2012

(65) Prior Publication Data
US 2013/0282225 A1    Oct. 24, 2013

(30) Foreign Application Priority Data

Nov. 16, 2010   (FR) ..................................... 10 04447

(51) Int. Cl.
*B60C 23/04* (2006.01)
*G01S 5/02* (2010.01)
(Continued)

(52) U.S. Cl.
CPC ........... *B60C 23/0416* (2013.01); *B60C 23/044* (2013.01); *B60C 23/045* (2013.01);
(Continued)

(58) Field of Classification Search
CPC ............ B60C 23/0408; B60C 23/0415; B60C 23/0416; B60C 23/0433; B60C 23/0435; B60C 23/0437; B60C 23/0438; B60C 23/044; B60C 23/0442; B60C 23/0444; B60C 23/0445; B60C 23/0447; B60C 23/0449; B60C 23/045; B60C 23/0452; B60C 23/0455; B60C 23/0486; B60C 23/0488; B60C 23/0489; G01S 5/02; G01S 5/0284; G01S 5/0289; H04B 7/0613; H04B 7/0837; H04B 17/0072; H04W 8/005
USPC ........... 701/29.1, 29.6, 29.7, 29.9, 30.1, 30.2, 701/30.3, 30.4, 30.5, 30.6, 32.9, 33.7, 34.4
See application file for complete search history.

(56) References Cited

U.S. PATENT DOCUMENTS 8,095,333 B2    1/2012   Penot et al.
2004/0230350 A1   11/2004   Ogawa et al.
(Continued)

FOREIGN PATENT DOCUMENTS

CN          101445025         6/2009
EP          1 826 031 A1      8/2007

OTHER PUBLICATIONS

International Search Report, dated Oct. 6, 2011, from corresponding PCT application.

*Primary Examiner* — Jerrah Edwards
(74) *Attorney, Agent, or Firm* — Young & Thompson

(57) ABSTRACT

The invention relates to a method for locating the wheels (R1, R2, R3, R4) of a motor vehicle (1), each one including a wheel unit (WU1, WU2, WU3, WU4) having its own identifier and the vehicle including at least three antennas. The determination of the location of the wheel unit by the central processing unit (2) of the vehicle includes:
  applying, for each identifier and to the number of signals received by the central processing unit, a transfer function specific to each antenna;
  calculating a number by multiplying the transfer function by one another such that they represent the specific front right, front left, rear right and rear left positions on the vehicle (1); and
  locating the wheel units by determining, for each specific position represented by the transfer functions, the identifier corresponding to the highest number P.

8 Claims, 4 Drawing Sheets

(51) Int. Cl.
 *H04B 7/06* (2006.01)
 *H04B 7/08* (2006.01)
 *H04B 17/27* (2015.01)
 *H04W 8/00* (2009.01)
(52) U.S. Cl.
 CPC .............. *B60C23/0444* (2013.01); *G01S 5/02* (2013.01); *H04B 7/0613* (2013.01); *H04B 7/0837* (2013.01); *H04B 17/27* (2015.01); *H04W 8/005* (2013.01)

(56) References Cited

U.S. PATENT DOCUMENTS

2007/0200693 A1   8/2007   Costes
2009/0144017 A1   6/2009   Penot et al.

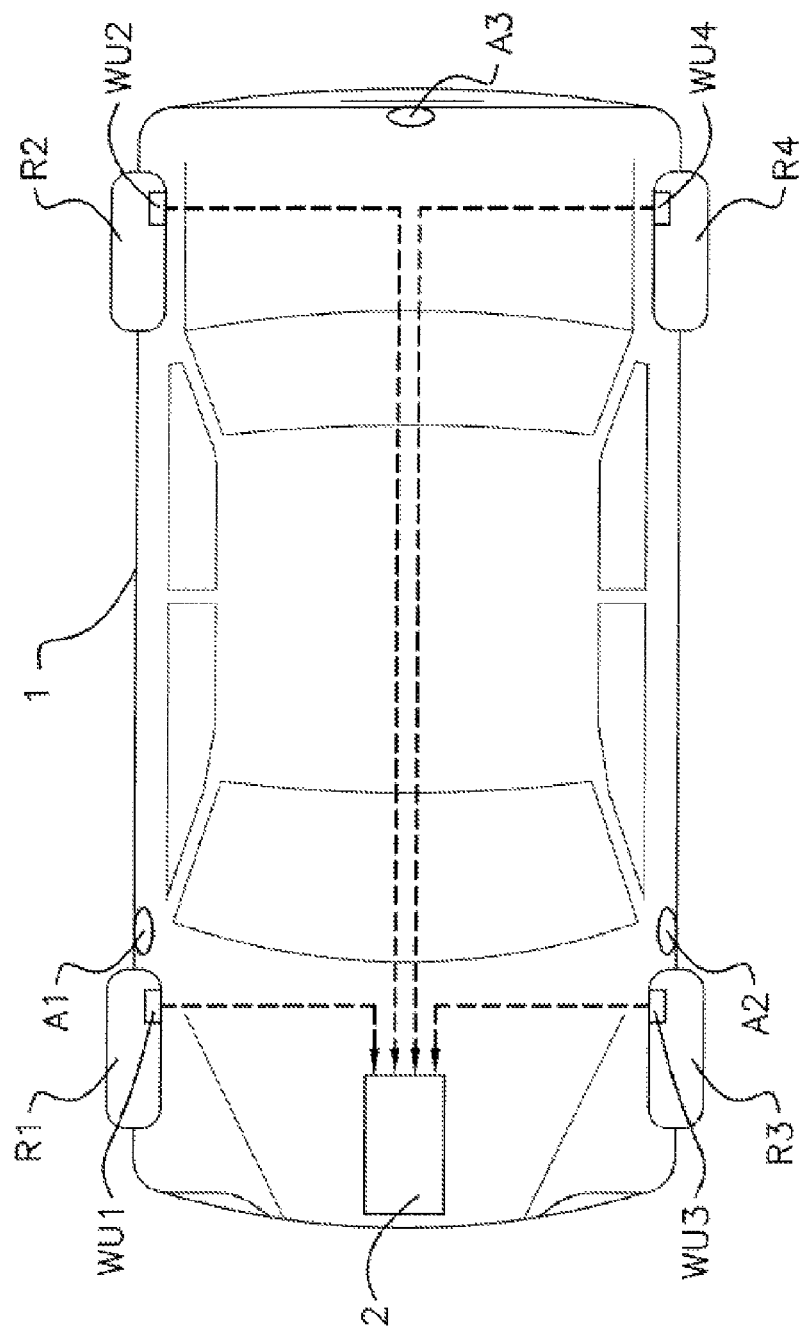

|     | $N(Id)_{left}$ | $N(Id)_{right}$ | $N(Id)_{rear}$ |
|-----|-----|-----|-----|
| $Id_1$ | 20 | 10 | 2 |
| $Id_2$ | 4 | 25 | 6 |
| $Id_3$ | 5 | 18 | 12 |
| $Id_4$ | 30 | 6 | 22 |

|     | fzleft | fzright | fzrear | fzfront |
|-----|-----|-----|-----|-----|
| $Id_1$ | 1 | 0.33 | 0 | 1 |
| $Id_2$ | 0 | 1 | 0.07 | 0.93 |
| $Id_3$ | 0 | 0.87 | 0.47 | 0.53 |
| $Id_4$ | 1 | 0.07 | 0.8 | 0.2 |

|     | fzFL | fzFR | fzRR | fzRL |
|-----|-----|-----|-----|-----|
| $Id_1$ | 1 | 0.33 | 0 | 0 |
| $Id_2$ | 0 | 0.93 | 0.07 | 0 |
| $Id_3$ | 0 | 0.46 | 0.4 | 0 |
| $Id_4$ | 0.2 | 0.01 | 0.05 | 0.8 |

METHOD FOR LOCATING THE WHEELS OF A VEHICLE FITTED WITH A SYSTEM FOR MONITORING TIRE PRESSURE

The invention relates to a method for locating the wheels of a vehicle fitted with a system for monitoring tire pressure.

For safety purposes, motor vehicles increasingly have systems for monitoring tire pressure comprising sensors fitted on each of the wheels of the vehicle, dedicated to the measurement of parameters such, as pressure or temperature, of the tires fitted to these wheels and intended to inform the driver of any abnormal variation of the measured parameter.

These monitoring systems are conventionally provided, on the one hand, with electronic units (also called wheel units) fitted on each of the wheels of the vehicle and including, in addition to the abovementioned sensors, a microprocessor and a radio transmitter and, on the other hand, a central processing unit (fitted on the vehicle) for receiving the signals transmitted by the transmitters of each wheel, comprising an electronic control unit (ECU) including a radio frequency receiver connected to an antenna.

Such monitoring systems necessitate the obligation of having to associate with each signal received by the receiver of the central unit an item of information relating to the location of the electronic unit, that is to say the wheel unit, and therefore of the wheel which is the source of that signal, this obligation lasting throughout the lifetime of the vehicle, that is to say having to be complied with even after wheel changes or more simply after reversing the positions of these wheels.

At present, there are several methods making it possible to determine the location of the wheels on a vehicle. Thus, for example, three low frequency (LF) radio antennas, situated in the driver's door handle, in the passenger's door handle and in the trunk of the car respectively, are used.

Firstly, a first step called an "initialization step" is carried out in which:
- the central processing unit of the vehicle firstly sends an LF signal to the three antennas by wired connection,
- the latter in their turn send an LF signal to the wheel units situated on the vehicle,
- each wheel unit receives the signals which are sent to it from the various antennas by means of an LF antenna situated in its casing,
- once the signals have been received, the wheel unit returns to the central processing unit, via its antenna, an RF message containing the number of signals which it has received from each antenna. This message furthermore contains the wheel unit's own identifier, as well as a measurement of the tire's acceleration and/or pressure, and/or temperature, etc.

The central processing unit thus constitutes the list of the identifiers of wheel units present on the vehicle.

The central processing unit then proceeds to a second step, called the locating step, in which it determines the correspondence between the positions of the wheels and the identifiers:
- the central processing unit of the vehicle thus retrieves one identifier per wheel unit as well as the number of received signals coming from the antennas which are associated with it. For a given wheel unit, the number of signals received from each antenna is compared by the central processing unit with a threshold; the wheel unit being located a priori close to the antenna from which it has received a number of signals equal to or greater than this threshold. By applying this algorithm to all of the numbers of signals received, per wheel unit, the central processing unit then derives the position of each wheel unit, with respect to these antennas. As the position of the antennas is fixed on the vehicle and known by the central processing unit, the latter derives the position of each wheel unit on the vehicle. It should be noted that only the wheel units having a non-zero acceleration are considered. The wheel unit located on the spare wheel, having a zero acceleration, is considered by the central processing unit as a wheel unit of a non-functional wheel and is directly attributed to the spare wheel.

For example, for a wheel unit having $Id_1$ as its identifier, and a receiving threshold greater than or equal to 20 signals, if this wheel unit receives 20 signals from the left antenna, 10 signals from the right antenna and 2 signals from the antenna located in the trunk, this wheel unit is then declared to be close to the left antenna and at the front of the vehicle because the number of signals that it has received from the left antenna is equal to the threshold 20 and the number of signals that it has received from the antenna located in the trunk is below that threshold. In order that a wheel unit may be declared to be at the rear left of the vehicle, it would have been necessary for it to additionally receive a number of signals greater than or equal to 20 from the antenna located in the trunk of the vehicle.

The same procedure is applied to the other wheel units. The central processing unit thus has the following table:

TABLE 1

| Identifier of the wheel unit | Number of signals received ||| Location of the wheel unit |
| | Right antenna | Left antenna | Trunk antenna | |
| --- | --- | --- | --- | --- |
| $Id_1$ | 20 | 10 | 2 | Front Right |
| $Id_2$ | 4 | 25 | 6 | Front Left |
| $Id_3$ | 5 | 20 | 25 | Rear Left |
| $Id_4$ | 30 | 6 | 22 | Rear Right |

With this information, the central processing unit confirms the positioning of the wheel units information for each wheel. It thus correlates the positioning of the wheel units with the different measurements of acceleration and/or of pressure and/or of temperature carried out. Any defect observed in a measured parameter is therefore attributed to a wheel which is precisely located on the vehicle.

The major disadvantage of such a method is that the reception of the LF messages by the wheel units is highly dependent on the sensitivity of reception of the wheel units and on interference phenomena during the propagation of the LF signal. In fact, when the strength of the message is below a certain threshold, the wheel unit does not receive the signal and does not increment the number of signals received for the corresponding antenna. Thus, in the above example, the wheel locating algorithm carried out by the central processing unit will not converge if the wheel unit $Id_1$ receives 18 signals coming from the left antenna in fact as this number of signals is below the threshold of 20, the wheel unit cannot be declared with certainty as being located on the left side of the vehicle. It is therefore necessary to restart the initialization phase, which takes time. Moreover, if a wheel unit is called "dumb", that is to say that an operational defect prevents it from transmitting and it does not send a message to the central processing unit, then its position cannot be determined as long as the other wheels have not been located. It will in fact be located by deduction from the positions of the other wheels.

It is however necessary for the wheels to be located quickly, in order to be able to detect the source of any operational fault measured by the wheel unit and to be able to warn the driver as soon as possible. It is not desirable to repeat the initialization phase several times. Moreover this phase consumes energy and, as the wheel units are powered by a button cell of limited lifetime, any useless consumption of energy must be avoided.

This disadvantage persists of course even if the antennas are four in number.

There is therefore a necessity to optimize the wheel locating algorithm in order that the latter converges more quickly.

The purpose of the present invention is to propose a locating method making it possible to overcome this disadvantage.

The invention proposes a method for locating the wheels of a motor vehicle, each wheel comprising a wheel unit having its own identifier and said vehicle comprising at least three antennas and a central processing unit communicating with the wheel units and the antennas, said method comprising the following steps:
1. At the request of the central processing unit, sending LF signals via the antennas to the wheel units,
2. Reception by the wheel units of a number of LF signals for each antenna,
3. Sending by each wheel unit to the central processing unit a message comprising its identifier as well as the number of signals that the wheel unit has received from each antenna,
4. Determination by the central processing unit of the location of the wheel unit, the step of determination of the location of the wheel unit by the central processing unit furthermore comprising the following steps:
   4a. For each identifier, application by the central processing unit to the number of signals received of a transfer function specific to each antenna,
   4b. For each identifier, calculation by the central processing unit of a number P by multiplication of the transfer functions by each other in such a way that they represent the specific front right, front left, rear right and rear left positions on the vehicle,
   4c. Location by the central processing unit of the wheel units, by determination for each front right, front left, rear right and rear left position, represented by the transfer functions, of the identifier corresponding to the largest number P.

In a first embodiment, when the number of antennas is equal to four, the transfer functions are then identical.

In a second embodiment, when the number of antennas is equal to three, then the transfer function corresponding to the missing antenna is judiciously derived from the function of the antenna located opposite on the vehicle.

In a third embodiment, when the number of antennas is equal to three, then three transfer functions are identical and the function corresponding to the missing antenna is derived from the function of the antenna located opposite on the vehicle. More precisely, the function corresponding to the missing antenna is the mathematical NOT function of the function of the antenna located opposite on the vehicle.

The transfer functions are preferably continuous positive functions. In a particular embodiment, the identical transfer functions have the value:
   0 when the number of signals received is less than or equal to 5,
   1 when the number of signals received in greater than or equal to 20.

Other subjects, features and advantages of the invention will become apparent on reading the following description given by way of non-limitative example and with reference to the appended drawings in which:

FIG. 1 is a diagrammatic view of a system for monitoring tire pressure,

FIG. 3 shows the results obtained at the different steps of the method of locating wheels according to the invention;

As shown in FIG. 1, a vehicle 1 is fitted with a central processing unit 2 and wheel units WU1, WU2, WU3 WU4 located on each of the wheels R1, R2, R3 R4. A fifth wheel unit (not shown) is fitted to the spare wheel (not shown), generally located in the trunk of the vehicle. In this example, the vehicle comprises three LF antennas: A1, A2, A3, respectively located at the front right, at the front left and centrally in the trunk of the vehicle.

The method according to the invention also applies to a system for locating the wheels using four antennas, the fourth antenna being, for example, located at the front of the vehicle.

As explained above, these antennas A1, A2, A3 communicate with the wheel units WU1, WU2, WU3, WU4 by low frequency radio waves (LF) and with the central processing unit 2 by wired connection.

Figure 2A:
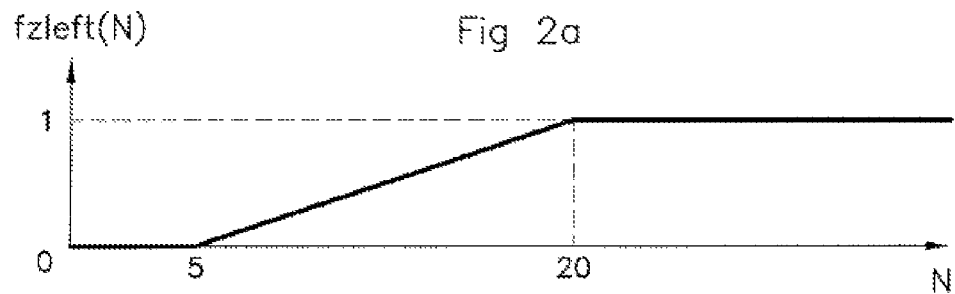
FIG. 2 shows the transfer functions used in the method of locating wheels, according to the invention.
Figure 2B:
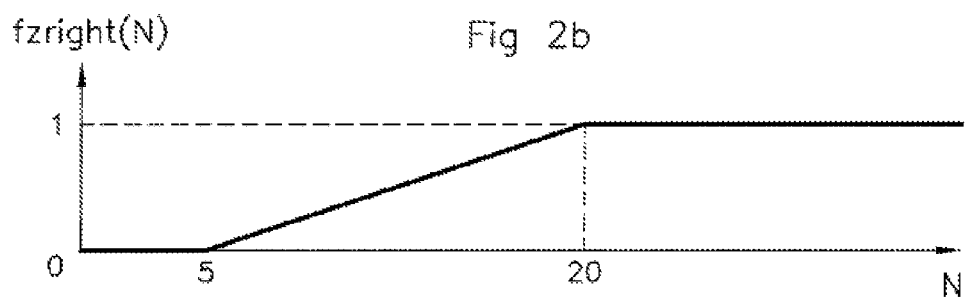
Figure 2C:
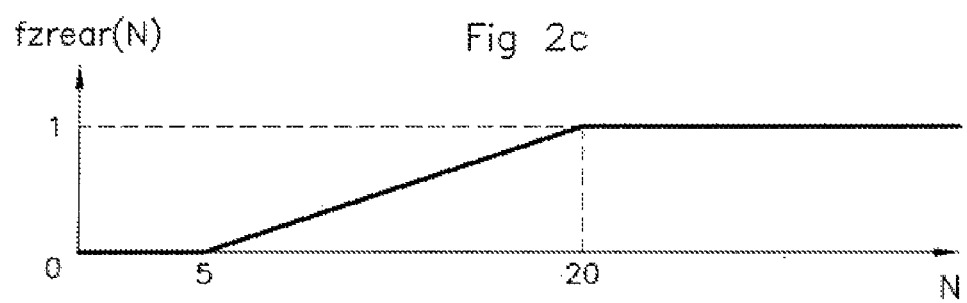
Figure 2D:
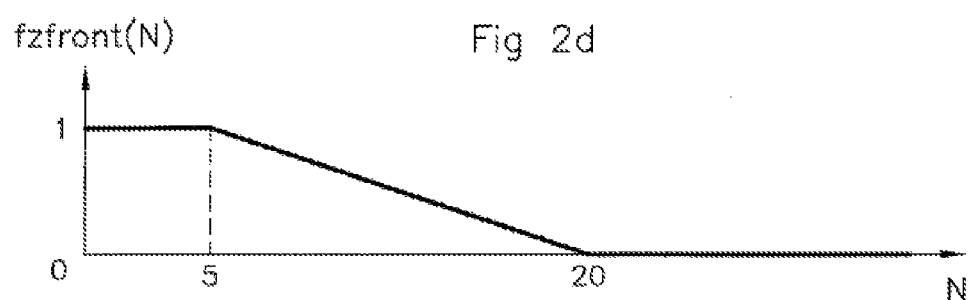
Figure 4:
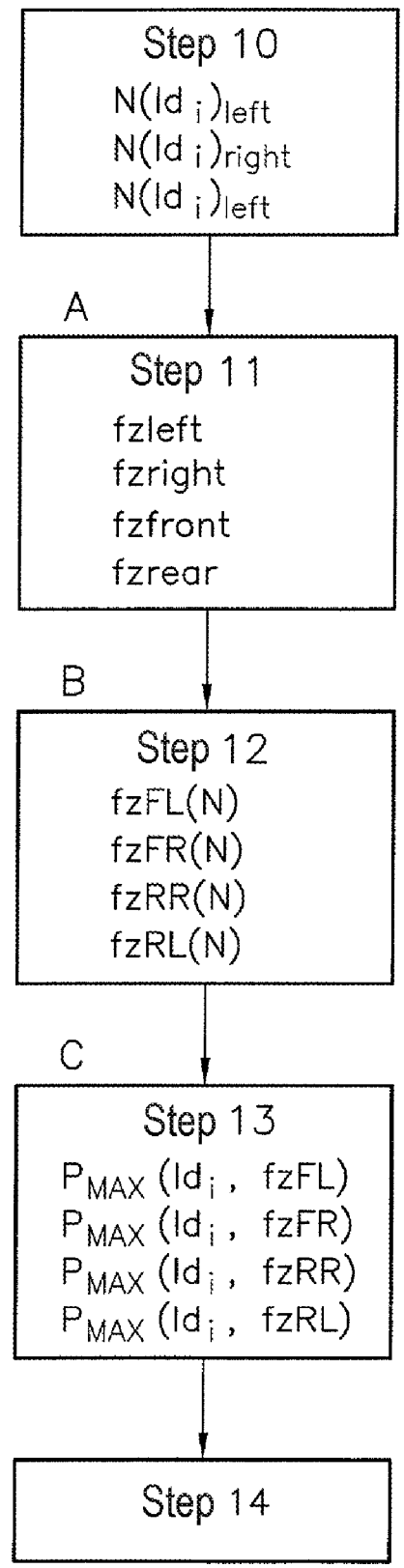
FIG. 4 shows a logic diagram representing the locating method according to the invention.

The locating method according to the invention is shown in FIG. 4. In step 10, after the central processing unit 2 has activated the wheel units by the intermediary of the antennas, as explained in the prior art, the wheel units WU1, WU2, WU3, WU4 send to the central processing unit 2 their respective identifiers $Id_1$, $Id_2$, $Id_3$, $Id_4$ as well as the number of signals they have each received from the different antennas. That is to say that the wheel units WU1, WU2, WU3, WU4 each send: $N(Id_i)_{left}$, $N(Id_i)_{right}$, $N(Id_i)_{rear}$, that is to say the number of signals respectively received from the antenna located at the front left $N(Id_i)_{left}$, from the antenna located at the front right $N(Id_i)_{right}$, and from the antenna located in the trunk of the vehicle $N(Id_i)_{rear}$. As each antenna transmits successively, when the wheel unit responds to the central processing unit, the central processing unit can therefore determine which antenna that response has come from.

These data are listed by the central processing unit 2, for example in a table A, as shown in FIG. 3a. In step 11, the invention proposes applying to these numbers of received signals a transfer function specific to the antenna from which they were transmitted. These transfer functions: fzleft(N), fzright(N), fzrear(N), fzfront(N) are applied for each identifier $Id_1$, $Id_2$, $Id_3$, $Id_4$, to the number of received signals N as follows:
   the function fzleft(N) is applied to the number of signals received from the front left antenna A2, that is to say $N(Id_i)_{left}$,
   the function fzright(N) is applied to the number of signals received from the front right antenna A1, that is to say $N(Id_i)_{right}$.
   the function fzrear(N) is applied to the number of signals received from the antenna located in the trunk A3, that is to say $N(Id_i)_{rear}$.

In this example, as there are three antennas, the transfer function fzfront(N) which corresponds to the imaginary antenna (since this antenna does not exist on the vehicle) located at the front of the vehicle is derived from the function fzrear(N) and is applied to the number of signals received from the antenna which is opposite to it on the vehicle, and therefore to the number of signals received from the antenna located in the trunk A3, that is to say $N(Id_i)_{rear}$.

This is illustrated in FIG. 2. In this example, and for the purpose of illustration, the functions fzleft(N), fzright(N), fzrear(N), are identical to each other and are positive continuous functions with a positive derivative. These functions take the value 0 for a number of received signals less than or equal to 5, and take the value 1 for a number of received signals greater than or equal to 20 (see FIGS. 2a, 2b, 2c). The transition between the values 0 and 1 is a straight line of positive slope in this example but can be envisaged as being of exponential, logarithmic, etc. shape.

In the absence of an antenna located at the front of the vehicle, the function fzfront(N) is opposite to the function fzrear(N), that is to say it is the function NOT(fzrear(N)) in mathematical terms and it therefore takes the value 1 for a number of received signals less than or equal to 5 and it takes the value 0 for a number of received signals greater than or equal to 20 (see FIG. 2d) and the transition between 0 and 1 is a straight line of negative slope.

The transfer functions can also be specific to the antennas and different from each other. These functions can be calibrated differently with received signals thresholds different from 5 or 20 and taking a value greater than or less than 1.

For example, a transfer function can take the value 1 for a number of received signals greater than or equal to 10, instead of 20, or can even take a value of 2 (instead of 1) for a number of received signals greater than or equal to 20. This calibration of the transfer function is particularly advantageous for weighting the number of signals coming from an antenna when the latter has been detected as having transmission problems or as being more distant from the wheel units than the other antennas.

The result of the application of the transfer functions fzleft(N), fzright(N), fzrear(N), fzfront(N), to the number of signals $N(Id_i)_{left}$, $N(Id_i)_{right}$, $N(Id_i)_{rear}$, received by the wheel units WU1, WU2, WU3, WU4 from each antenna A1, A2, A3 is illustrated in the form of a table B in FIG. 3b. In this example, all of the values are included between 0 and 1, the transfer functions being included between 0 and 1.

In step 12, according to the invention, the transfer functions are then multiplied by each other in order to represent judiciously a specific position on the vehicle, as follows (see table C in FIG. 3c):

fzFL(N) is the product of fzfront(N)*fzleft(N) and represents the front left position of the vehicle,
fzFR(N) is the product of fzfront(N)*fzright(N) and represents the front right position of the vehicle,
fzRR(N) is the product of fzrear(N)*fzright(N) and represents the rear right position of the vehicle,
finally, fzRL(N) is the product of fzrear(N)*fzleft(N) and represents the rear left position of the vehicle.

The result of these multiplications between the transfer functions is illustrated in the form of a table C in FIG. 3c. It is recalled, that $P(Id_1, fzFL)$ is the result of the product for the identifier between the transfer function fzfront and the transfer function fzleft. The values P: $P(Id_i, fzFL)$, $P(Id_i, fzFR)$, $P(Id_i, fzRR)$, $P(Id_i, fzRL)$ in our example are all included between 0 and 1. If the transfer functions are calibrated differently, then the values P will of course have values included within different ranges.

Step 13 consists in analyzing these results. For each position on the vehicle represented by a function fzFL, fzFR, fzRR and fzRL, the wheel unit corresponding to that position is the one whose identifier has the biggest value P for that position, which will be called $P_{MAX}$: $P_{MAX}(Id_i, fzFL)$, $P_{MAX}(Id_i, fzFR)$, $P_{MAX}(Id_i, fzRR)$, $P_{MAX}(Id_i, fzRL)$.

Thus, as shown in FIG. 3c:
for the wheel unit having the identifier $Id_1$, the biggest value P is given by the function fzFL, $P_{MAX}(Id_1, fzFL)=1$ and the wheel unit is therefore located at the front left of the vehicle,
for the wheel unit having the identifier $Id_2$, the biggest value P is given by the function fzFR, $P_{MAX}(Id_2, fzFR)=0.93$ and the wheel unit is therefore located at the front right of the vehicle,
for the wheel unit having the identifier $Id_3$, the biggest value P is given by the function fzRR, $P_{MAX}(Id_3, fzRR)=0.4$ and the wheel unit is therefore located at the rear right of the vehicle,
for the wheel unit having the identifier $Id_4$, the biggest value P is given by the function fzRL, $P_{MAX}(Id_4, fzRL)=0.8$ and the wheel unit is therefore located at the rear left of the vehicle.

Step 14 consists in the location of the wheel units.

The transfer functions can of course be negative and for example take the value −1 for a number of received signals greater than or equal to 20, in this case the search for the location of the wheel is carried out in table C for the wheel identifier having the smallest value of P.

When the transfer functions are all different, then the analysis of the results of the invention for determining the position of the wheel units must take account of the different weightings applied to the transfer functions in the evaluation the number P.

The invention thus makes it possible to locate the wheels faster, that is to say in a single initialization step. There is no need to repeat this phase several times because the location algorithm according to the invention converges with a single collection of numbers of signals received by the wheel units. The invention therefore allows a saving of time and a significant reduction in the energy consumed, as well as an increase in the reliability of the system for monitoring tire pressure.

The invention is not of course limited to the described and represented embodiment which was given only by way of example.

The invention claimed is:
1. A method for locating the wheels of a motor vehicle, each wheel, R4) comprising a wheel unit having its own identifier and said vehicle comprising at least three antennas and a central processing unit communicating with the wheel units and the antennas, said method comprising the following steps:
at the request of the central processing unit, sending LF signals via the antennas to the wheel units,
reception by the wheel units of a number of LF signals for each antenna,
sending by each wheel unit to the central processing unit a message comprising its identifier as well as the number of signals that the wheel unit has received from each antenna,
determination by the central processing unit of the location of the wheel unit,
wherein the step of determination of the location of the wheel unit by the central processing unit further comprises the following steps:
for each identifier, application by the central processing unit to the number of signals received of a transfer function specific to each antenna, wherein each transfer function takes:
a first value within a first interval,
a second value within a second interval, and a third value within a third interval, the first value being smaller than the second value, and the second value being smaller than the third value, for each identifier, calculation by the central processing unit of a number P by multiplication of the results of the transfer functions by each other in such a way that they represent the specific front right, front left, rear right and rear left positions on the vehicle, location by the central processing unit of the wheel units, by determination for each front right, front left, rear right and rear left position, represented by the transfer functions, of the identifier corresponding to the largest number P.

2. The locating method as claimed in claim 1, characterized in that when the number of antennas is equal to four, the transfer functions are then identical.

3. The locating method as claimed in claim 1, characterized in that when the number of antennas is equal to three, then the transfer function corresponding to the missing antenna is derived from the function of the antenna located opposite on the vehicle.

4. The locating method as claimed in claim 1, characterized in that when the number of antennas is equal to three, then three transfer functions are identical and the function corresponding to the missing antenna is derived from the function of the antenna located opposite on the vehicle.

5. The locating method as claimed in claim 4, characterized in that the function corresponding to the missing antenna is the mathematical NOT function of the function of the antenna located opposite on the vehicle.

6. The locating method as claimed in claim 1, characterized in that the transfer functions are continuous positive functions.

7. The locating method as claimed in claim 2, characterized in that the identical transfer functions have the value:
   0 when the number of signals received is less than or equal to 5,
   1 when the number of signals received in greater than or equal to 20.

8. The locating method as claimed in claim 4, characterized in that when the number of antennas is equal to three, then three transfer functions are identical and the function corresponding to the missing antenna is derived from the function of the antenna located opposite on the vehicle.

* * * * *